US009047837B2

(12) United States Patent
Nam et al.

(10) Patent No.: US 9,047,837 B2
(45) Date of Patent: Jun. 2, 2015

(54) LIQUID CRYSTAL DISPLAY AND METHOD OF DRIVING THE LIQUID CRYSTAL DISPLAY

(75) Inventors: Doo-In Nam, Yongin (KR); Yong-Joo Kim, Yongin (KR); Gyung-Kook Kwak, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 416 days.

(21) Appl. No.: 13/280,611

(22) Filed: Oct. 25, 2011

(65) Prior Publication Data

US 2012/0188213 A1 Jul. 26, 2012

(30) Foreign Application Priority Data

Jan. 26, 2011 (KR) ........................ 10-2011-0007884

(51) Int. Cl.
*G06F 3/038* (2013.01)
*G09G 3/36* (2006.01)

(52) U.S. Cl.
CPC ............ *G09G 3/3648* (2013.01); *G09G 3/3614* (2013.01); *G09G 2310/0245* (2013.01)

(58) Field of Classification Search
CPC .................................. G06F 3/038; G09G 3/36
USPC ...................................... 345/208, 212, 94, 87
See application file for complete search history.

(56) References Cited

U.S. PATENT DOCUMENTS

| | | | | |
|---|---|---|---|---|
| 6,639,580 | B1 * | 10/2003 | Kishi et al. | 345/107 |
| 2002/0197927 | A1 * | 12/2002 | Jindai et al. | 445/24 |
| 2004/0032385 | A1 * | 2/2004 | Park et al. | 345/95 |
| 2006/0097132 | A1 * | 5/2006 | Nam et al. | 250/208.1 |
| 2009/0315528 | A1 * | 12/2009 | Choi et al. | 323/282 |
| 2011/0074664 | A1 * | 3/2011 | Lebrun et al. | 345/98 |

FOREIGN PATENT DOCUMENTS

| | | | |
|---|---|---|---|
| JP | 2002-099256 | A | 4/2002 |
| KR | 10-2003-0073070 | A | 9/2003 |
| KR | 10-2004-0013785 | A | 2/2004 |
| KR | 10-0529566 | B1 | 11/2005 |
| WO | WO 2009/019253 | * | 2/2009 |

* cited by examiner

*Primary Examiner* — Pegeman Karimi
(74) *Attorney, Agent, or Firm* — Lee & Morse, P.C.

(57) ABSTRACT

A liquid crystal display device (LCD), and a method of driving the LCD. The LCD includes: a display panel including a plurality of pixels defined as a plurality of gate lines and a plurality of data lines cross each other, wherein a storage capacitor of each of the plurality of pixels is connected to a front or rear gate line; a gate driver for generating a gate-on voltage by boosting a first input voltage in multi-stages, the gate-on voltage turns on a switching device of each of the plurality of pixels, and a gate-off voltage that turns off the switching device, and sequentially applying the gate-on voltage and the gate-off voltage to the plurality of gate lines; and a source driver for applying a data voltage to a data line connected to a pixel whose switching device is turned on.

15 Claims, 5 Drawing Sheets

LIQUID CRYSTAL DISPLAY AND METHOD OF DRIVING THE LIQUID CRYSTAL DISPLAY

CROSS-REFERENCE TO RELATED PATENT APPLICATION

This application claims the benefit of Korean Patent Application No. 10-2011-0007884, filed on Jan. 26, 2011, in the Korean Intellectual Property Office, the disclosure of which is incorporated herein in its entirety by reference.

BACKGROUND

1. Field

Embodiments relate to a liquid crystal display and a method of driving the liquid crystal display, and more particularly, to a liquid crystal display for preventing a white flash phenomenon, and a method of driving the liquid crystal display.

2. Description of the Related Art

Due to light-weight, thinness, and low power consumption of liquid crystal display devices (LCDs), LCDs are widely used as a display device of a laptop, portable television, or the like. Specifically, an active matrix type LCD using a thin film transistor (TFT) as a switching device is suitable for displaying a dynamic image.

FIG. 1 illustrates an equivalent circuit diagram of a pixel of a general LCD. Referring to FIG. 1, the LCD charges a liquid crystal capacitor Clc by converting digital input data to an analog data voltage based on a gamma reference voltage, and supplying the analog data voltage to a data line while supplying a gate voltage to a gate line.

A gate electrode of a TFT is connected to the gate line, a source electrode of the TFT is connected to the data line. Also, a drain electrode of the TFT is connected to a pixel electrode of the liquid crystal capacitor Clc and one electrode of a storage capacitor Cst.

The storage capacitor Cst uniformly maintains a voltage of the liquid crystal capacitor Clc by charging the data voltage applied from the data line when the TFT is turned on according to a potential difference between the pixel electrode and a common electrode.

A common voltage Vcom is applied to common electrodes of the liquid crystal capacitor Clc and the storage capacitor Cst.

When the gate voltage is applied to the gate line, the TFT is turned on to form a channel between the source electrode and the drain electrode, and thus a voltage of the data line is applied to the pixel electrode of the liquid crystal capacitor Clc. Here, an arrangement of liquid crystal molecules of the liquid crystal capacitor Clc is changed according to the potential difference between the pixel electrode and the common electrode, thereby modulating an incident light.

Meanwhile, in order to charge the storage capacitor Cst using the common voltage Vcom, the storage capacitor Cst has conductivity of a metal by being doped with amorphous silicon (P—Si). However, a mask is added during such a doping process, and thus a manufacturing cost is increased and a manufacturing process becomes complex.

SUMMARY

One or more embodiments provide a structure of a storage capacitor that does not require a doping process.

One or more embodiments provide a method of driving a liquid crystal display device (LCD) for reducing and/or preventing a white flash phenomenon generated while charging the storage capacitor.

One or more embodiments provide a liquid crystal display device (LCD) including a display panel including a plurality of pixels defined as a plurality of gate lines and a plurality of data lines cross each other, wherein a storage capacitor of each of the plurality of pixels is connected to an adjacent gate line, a gate driver for generating a gate-on voltage by boosting a first input voltage in multi-stages, the gate-on voltage turns on a switching device of each of the plurality of pixels, and a gate-off voltage that turns off the switching device, and sequentially applying the gate-on voltage and the gate-off voltage to the plurality of gate lines, and a source driver for applying a data voltage to a data line connected to a pixel whose switching device is turned on.

The gate driver may include a gate-on voltage generator for generating the gate-on voltage; and a gate-off voltage generator for generating the gate-off voltage.

The gate-on voltage generator may include a first booster for generating a first boosting voltage by pumping the first input voltage; a second booster for generating a second boosting voltage by pumping the first boosting voltage; and a third booster for generating a third boosting voltage by pumping the second boosting voltage.

A difference between the first and second boosting voltages may be below or equal to 1 V. A difference between the second and third boosting voltages may be below or equal to 1 V.

The gate-on voltage may be generated via boosting three or more stages.

The storage capacitor of each of the plurality of pixels may be connected to the adjacent gate line corresponding to a gate line of an adjacent one of the plurality of pixels.

Each of the plurality of pixels may include a switching device having a gate electrode connected to a gate line, a source electrode connected to a data line, and a drain electrode connected to a pixel electrode, a liquid crystal capacitor having one end connected to the pixel electrode, and charged by a potential difference between the pixel electrode and a common electrode, and a storage capacitor having one end connected to the liquid crystal capacitor and another end connected to a front or rear gate line, and charged when the gate-on voltage is applied to the front or rear gate line.

One or more embodiments may provide a liquid crystal display device (LCD) including a gate-on voltage generator for generating a gate-on voltage by boosting a first input voltage in multi-stages, the gate-on voltage turns on a switching device of a pixel, and a gate-off voltage generator for generating a gate-off voltage by decompressing a second input voltage, and applying the gate-off voltage to the gate line.

According to another aspect of the present invention, there is provided a method of driving a liquid crystal display device (LCD), the method including: generating a gate-on voltage by boosting a first input voltage in multi-stages; applying the generated gate-on voltage to a gate line to turn on a switching device of a pixel; and generating a gate-off voltage by decompressing a second input voltage, and applying the gate-off voltage to the gate line.

The generating of the gate-on voltage may include generating a first boosting voltage by pumping the first input voltage, generating a second boosting voltage by pumping the first boosting voltage, and generating a third boosting voltage by pumping the second boosting voltage.

A difference between the first and second boosting voltages may be below or equal to 1 V. A difference between the second and third boosting voltages may be below or equal to 1 V.

The gate-on voltage may be generated via boosting equal to or above 3-stages.

BRIEF DESCRIPTION OF THE DRAWINGS

Features of embodiments will become more apparent by describing in detail exemplary embodiments thereof with reference to the attached drawings, in which.

DETAILED DESCRIPTION

Figure 1:
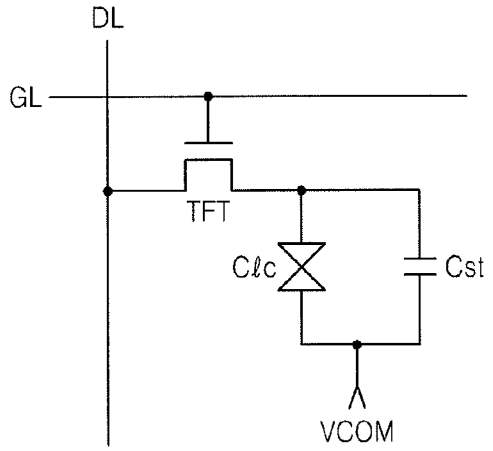
FIG. 1 (RELATED ART)
FIG. 1 illustrates an equivalent circuit diagram of a pixel of a general liquid crystal display device (LCD)

Features will be described more fully with reference to the accompanying drawings, in which exemplary embodiments are shown. In the drawings, like reference numerals denote like elements. Also, in the following description, certain detailed explanations of related art may not be explicitly described when it is deemed that the description thereof may unnecessarily obscure more pertinent features of embodiments.

While such terms as "first," "second," etc., may be used to describe various components, such components must not be limited to the above terms. The above terms are used only to distinguish one component from another. For example, a first element may be named as a second element and vice versa while not deviating from the ranges of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
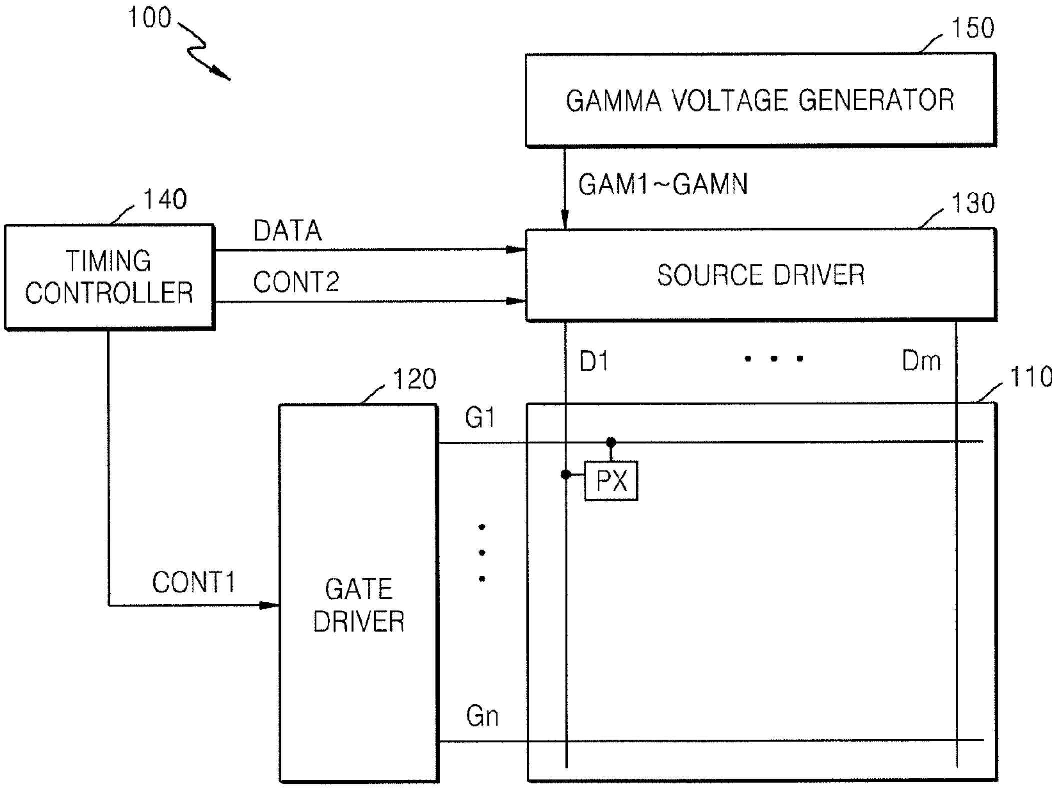
FIG. 2 illustrates a block diagram of an exemplary embodiment of an LCD.
Figure 3:
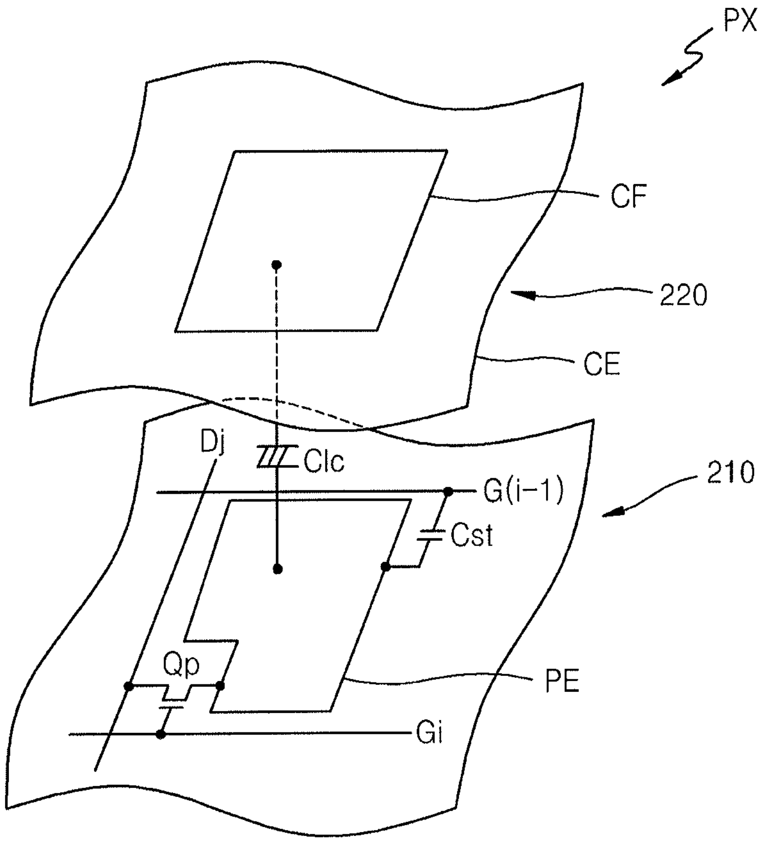
FIG. 3 illustrates a schematic diagram of an exemplary embodiment of a pixel of the LCD of FIG. 2.

FIG. 2 illustrates a block diagram of an exemplary embodiment of an LCD 100. FIG. 3 illustrates a schematic diagram of an exemplary embodiment of a pixel PX of the LCD 100 of FIG. 2.

Referring to FIG. 2, the LCD 100 may include a liquid crystal panel 110, a gate driver 120, a source driver 130, a timing controller 140, and a gamma voltage generator 150.

The LCD 100 may drive the liquid crystal panel 110 by providing a plurality of gamma voltages GAM1 through GAMN to the source driver 130 using the gamma voltage generator 150, applying a data voltage to first through mth data lines D1 through Dm of the liquid crystal panel 110 using the source driver 130, and applying a gate voltage to first through nth gate lines G1 through Gn of the liquid crystal panel 110 using the gate driver 120, wherein N, m, and n are each a natural number. The LCD 100 may control the gate driver 120 and the source driver 130 by providing a gate control signal CONT1 and a data control signal CONT2, respectively, to the gate driver 120 and the source driver 130, using the timing controller 140.

The liquid crystal panel 110 may include the first through nth gate lines G1 through Gn, the first through mth data lines D1 through Dm, and the pixels PX. The first through nth gate lines G1 through Gn may be arranged in lines while being uniformly spaced apart from each other, and may each transmit a gate voltage. The first through mth data lines D1 through Dm may be arranged in columns while being uniformly spaced apart from each other, and may each transmit a data voltage. The first through nth gate lines G1 through Gn and the first through mth data lines D1 through Dm may be arranged in a matrix form, and one pixel PX may be formed at each intersection.

An exemplary embodiment of the pixel PX of FIG. 2 will now be described with reference to FIG. 3. The liquid crystal panel 110 may be formed by disposing a liquid crystal layer (not shown) between a first substrate 210 and a second substrate 220. The first substrate 210 may include the first through nth gate lines G1 through Gn, the first through mth data lines D1 through Dm, a pixel switching device Qp, and a pixel electrode PE. The second substrate 220 may include a color filter CF and a common electrode CE. Embodiments are not limited to the exemplary structure of FIGS. 2 and 3. For example, in one or more embodiments, the color filter CF may be arranged on or below the pixel electrode PE of the first substrate 210.

In one or more embodiments, the pixel PX may include the pixel switching device Qp, a storage capacitor Cst and a liquid crystal capacitor Clc. The pixel PX may be connected to the ith gate line Gi and a jth data line Dj, where i is a natural number from 1 to n and j is a natural number from 1 to m. The pixel switching device Qp may include a gate electrode connected to the ith gate line Gi, a first electrode connected to a jth data line Dj, and a second electrode connected to the pixel electrode PE. The storage capacitor Cst may be coupled to the second electrode of the pixel switching device Qp through the pixel electrode PE.

The liquid crystal capacitor Clc may correspond to the pixel electrode PE of the first substrate 210 and the common electrode CE of the second substrate 220 as two respective electrodes thereof, and a liquid crystal layer operating as a dielectric substance between the pixel electrode PE and the common electrode CE. A common voltage may be applied to the common electrode CE. Light transmittance of the liquid crystal layer may be adjusted according to a voltage applied to the pixel electrode PE, and thus, luminance of each of the pixels PX may be adjusted.

The pixel electrode PE may be coupled to the jth data line Dj through the pixel switching device Qp. The pixel switching device Qp may include a gate electrode connected to the ith gate line Gi, a source electrode connected to the jth data line Dj, and a drain electrode connected to the pixel electrode PE. The pixel switching device Qp is turned on when a gate-on voltage is applied to the ith gate line Gi, and applies the data voltage transmitted through the jth data line Dj to the pixel electrode PE. The pixel switching device Qp may be a thin film transistor formed of amorphous silicon.

In one or more embodiments, the storage capacitor Cst may have one end connected to the pixel electrode PE, and another end connected to an adjacent gate line. More particularly, e.g., for an nth pixel PXn, the storage capacitor Cstn may have one end connected to the pixel electrode PE and the other end connected to the (n+1)th or the (n−1)th gate line. The storage capacitor Cst may maintain a charge voltage of the liquid crystal capacitor Clc while the pixel switching device Qp is turned off, between the pixel electrode PE and the adjacent gate line, e.g. previous or subsequent gate line. More particularly, e.g., the storage capacitor Cst of the ith gate line Gi is connected to an i−1th gate line Gi−1. In other words, in one or more the storage capacitor Cst connected to the i−1th gate line Gi−1 operates as a storage capacitor of the pixel switching device Qp connected to the ith gate line Gi. Alternatively, e.g., the storage capacitor Cst of the ith gate line Gi may be connected to the i+1th gate line Gi+1.

By employing the respective gate line, e.g., Gi, and the adjacent gate line Gi+1 or Gi−1, e.g., front or rear gate line, for charging the storage capacitor Cst, one or more embodiments of the LCD 100 may have relatively low manufacturing costs and simple manufacturing processes. More particularly, in one or more embodiments, since the storage capacitor Cst may be charged without using a common voltage Vcom, in such cases, doping for amorphous silicon (P—Si) is also not required. Thus, in one or more embodiments, a doping mask for amorphous silicon is not additionally required and manufacturing cost and/or complexity may be reduced.

The gate driver 120 may sequentially drive the first through nth gate lines G1 through Gn in response to the gate control signal CONT1. The gate driver 120 may generate the gate voltages VG having a combination of a gate-on voltage VGH in an active level and a gate-off voltage VGL in an inactive level, and may sequentially supply the gate voltages VG to the liquid crystal panel 110 through the first through nth gate lines G1 through Gn.

When a mode of the liquid crystal panel 110 is switched to a normal display mode via power-in or sleep-out from power-off, sleep-in, or a standby mode, a white flash phenomenon, wherein a screen momentarily brightens, may occur. The white flash phenomenon may occur because the storage capacitor Cst is unintentionally momentarily charged as a gate-on voltage to be applied to the liquid crystal panel 110 is generated via a momentary boost, and thus, a potential difference is formed in the liquid crystal capacitor Clc. Here, the normal display mode is a mode in which the liquid crystal panel 110 displays a normal screen as a gate-on voltage and a data voltage are applied to the liquid crystal panel 110.

In one or more embodiments, the gate-on voltage VGH to be applied to a gate line may be generated via boosting in multi-stages. Thus, in one or more embodiments, a white flash phenomenon that is momentarily generated before a normal image is displayed may be prevented when the liquid crystal panel 110 is driven by supplying power to the liquid crystal panel 110. When the gate-on voltage VGH is generated via boosting in multi-stages, the white flash phenomenon may be prevented because a changed amount of liquid crystal operation according to charging of the storage capacitor Cst, and a potential difference of the liquid crystal capacitor Clc due to the change amount may be reduced. The gate-on voltage VGH may be generated via boosting of at least 3-stages, such as 3, 4, or 5-stages.

The gate-on voltage VGH that is boosted in multi-stages may be sequentially applied to the liquid crystal panel 110 through the first through nth gate lines G1 through Gn.

The source driver may generate a data voltage corresponding to a gray scale of input image data DATA by using the gamma voltage GAM in response to the data control signal CONT2, and may output the data voltage to the liquid crystal panel 110 through the first through mth data lines D1 through Dm. When the gate-on voltage VGH is sequentially applied to the liquid crystal panel 110 through the first through nth gate lines G1 through Gn, the source driver 130 supplies the data voltage to the liquid crystal panel 110.

The timing controller 140 receives the input image data DATA and an input control signal for controlling display of the input image data DATA from an external graphic controller (not shown). Examples of the input control signal include a horizontal synchronization signal Hsync, a vertical synchronization signal Vsync, and a main clock MCLK. The timing controller 140 may transmit the input image data DATA to the source driver 130, and may generate and transmit the gate control signal CONT1 and the data control signal CONT2, respectively, to the gate driver 120 and the source driver 130. The gate control signal CONT1 may include a scan start signal instructing to start scanning, and a plurality of clock signals. The data control signal CONT2 may include a horizontal synchronization start signal instructing to transmit the input image data DATA of the pixel PX of one line, and a clock signal.

The gamma voltage generator 150 may generate and output a plurality of gamma voltages GAM1 through GAMN to the source driver 130. The gamma voltages GAM1 through GAMN may include a positive polar gamma voltage and a negative polar gamma voltage, which are distributed between a high potential power voltage VDD and a low potential power voltage VSS.

Figure 4:
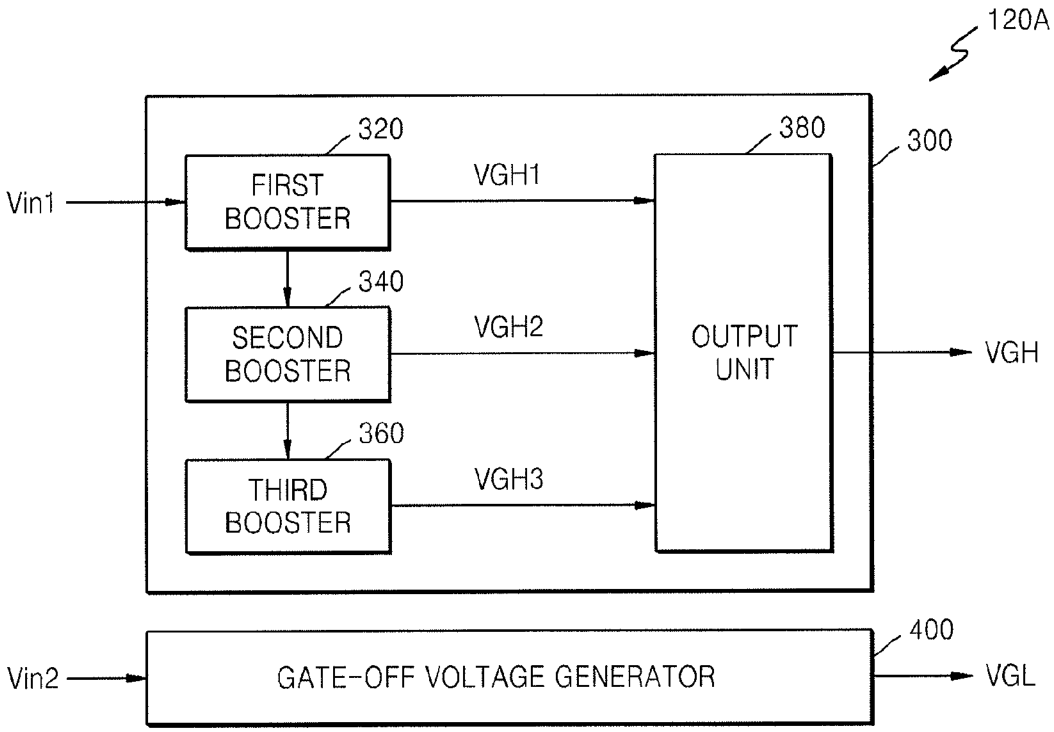
FIG. 4 illustrates a block diagram of an exemplary embodiment of a gate driver.

FIG. 4 illustrates a block diagram of an exemplary embodiment of a gate driver 120A.

Referring to FIG. 4, the gate driver 120A may include a gate-on voltage generator 300 and a gate-off voltage generator 400.

When the liquid crystal panel 110 is started to be driven, the gate-on voltage generator 300 may generate the gate-on voltage VGH to be applied to the first through nth gate lines G1 through Gn. The gate-on voltage generator 300 may output the gate-on voltage VGH by receiving a first input voltage Vin1, and the gate-off voltage generator 400 may output the gate-off voltage VGL by receiving a second input voltage Vin2. The first and second input voltages Vin1 and Vin2 may be the same voltage Vin. Alternatively, the first and second input voltages Vin1 and Vin2 may be an external power voltage VDD.

The gate-on voltage generator 300 may generate the gate-on voltage VGH via boosting in at least 3-stages. In one or more embodiments, a white flash phenomenon may be reduced by forming the gate-on voltage VGH via boosting in at least 3-stages by reducing a boosting amount at each boosting step. In detail, the potential difference of the liquid crystal capacitor Clc may be reduced by setting a boosting voltage in each boosting step to be below or equal to 1 V.

In one or more embodiments, the gate-on voltage generator 300 may generate the gate-on voltage VGH via the boosting of at least 3-stages. Embodiments are not, however, limited thereto. For example, the gate-on voltage generator 300 may include at least 3 boosters for boosting of at least 3-stages as described above.

For example, in one or more embodiments, the gate-on voltage generator 300 may include a first booster 320, a second booster 340, a third booster 360, and an output unit 380.

The first booster 320 may pump the first input voltage Vin1 to a first boosting voltage VGH1. The first booster 320 may include various boosting circuits for pumping the first input voltage Vin1 to the first boosting voltage VGH1. For example, the first booster 320 may increase the first input voltage Vin1 to the first boosting voltage VGH1 using a capacitor (not shown) disposed between a driver (not shown) activated by a pumping enable signal, and a node to which the first input voltage Vin1 is applied. A boosting amount of the first booster 320 may be determined according to an entire boosting amount. In one or more embodiments, the boosting amount of the first booster 321 may be below or equal to 1 V.

The first booster 320 may output the first boosting voltage VGH1 to the second booster 340 and the output unit 380.

The second booster 340 may receive the first boosting voltage VGH1, and may pump the first boosting voltage VGH1 to a second boosting voltage VGH2. The second booster 340 may include various boosting circuits for pumping the first boosting voltage VGH1 to the second boosting voltage VGH2. For example, the second booster 340 may increase the first boosting voltage VGH1 to the second boosting voltage VGH2 using a capacitor (not shown) disposed between a driver (not shown) activated by a pumping enable signal, and a node to which the first boosting voltage VGH1 is applied. The second booster 340 may pump the first boosting voltage VGH1 to the second boosting voltage VGH2 after a predetermined time after the first boosting voltage VGH1 is pumped. The predetermined time may be determined based on an operating condition and a design margin of a display panel, and may be equal to and/or within the range from about 5 ms to about 10 ms. A boosting amount of the second booster 340 may be determined according to an entire boosting amount. In one or more embodiments, the boosting amount of the second booster 340 may be below or equal to 1 V.

The second booster 340 may output the second boosting voltage VGH2 to the third booster 360 and the output unit 380.

The third booster 360 may receive the second boosting voltage VGH2, and may pump the second boosting voltage VGH2 to a third boosting voltage VGH3. The third booster 360 may include various boosting circuits for pumping the second boosting voltage VGH2 to the third boosting voltage VGH3. For example, the third booster 360 may increase the second boosting voltage VGH2 to the third boosting voltage VGH3 using a capacitor (not shown) disposed between a driver (not shown) activated by a pumping enable signal, and a node to which the second boosting voltage VGH2 is applied. The third booster 360 may pump the second boosting voltage VGH2 to the third boosting voltage VGH3 after a predetermined time after the second boosting voltage VGH2 is pumped. The predetermined time may be determined based on an operating condition and a design margin of a display panel, and may be equal to and/or within the range from about 5 ms to about 10 ms. A boosting amount of the third booster 360 may be determined according to an entire boosting amount. The boosting amount of the third booster 360 may be below or equal to 1 V. In one or more embodiments, a level of the third boosting voltage VGH3 may be equal to and/or greater than that of a target gate-on voltage. More particularly, e.g., in embodiments including only three boosts, the level of the third boosting voltage VGH3 is equal and/or greater than that of the target gate-on voltage.

The third booster 360 may output the third boosting voltage VGH3 to the output unit 380.

The output unit 380 may sequentially receive the first through third boosting voltages VGH1 through VGH3, and may sequentially apply the third boosting voltage VGH3 to gate lines as a gate-on voltage.

The gate-off voltage generator 400 may decompress the second input voltage Vin2 to the gate-off voltage VGL. For example, the gate-off voltage generator 400 may decompress the second input voltage Vin2 to the gate-off voltage VGL using a buck converter, or the like. The gate-off voltage generator 400 may apply the gate-off voltage VGL to the gate lines after a predetermined time after the gate-on voltage VGH is applied to the gate lines.

Figure 5:
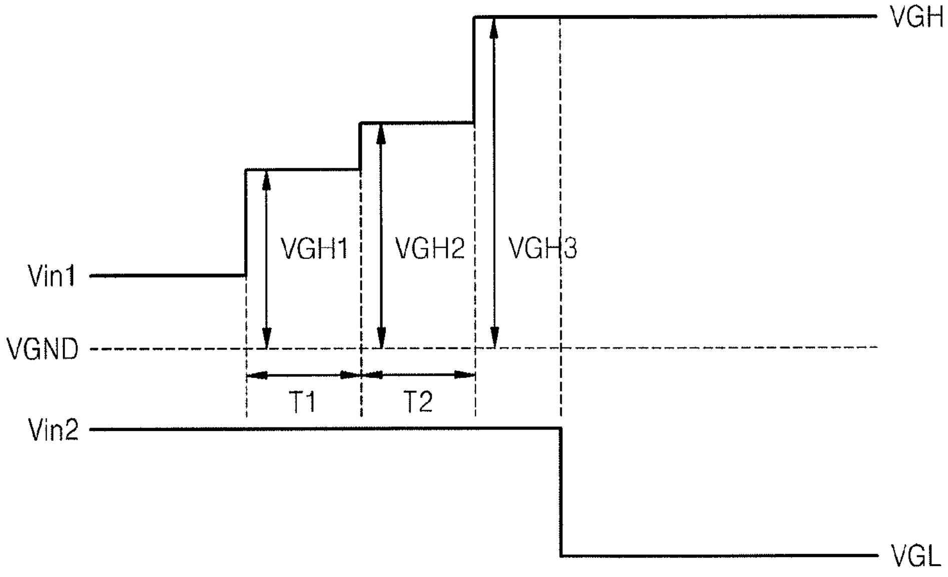
FIG. 5 illustrates a timing diagram of exemplary gate voltages employable with one or more embodiments.

FIG. 5 illustrates a timing diagram of exemplary gate voltages employable with one or more embodiments.

Referring to FIG. 5, the gate-on voltage VGH may be generated by boosting the first input voltage Vin1 in multi-stages, and the gate-off voltage VGL may be generated by decompressing the second input voltage Vin2.

In the exemplary embodiment of FIG. 5, the gate-on voltage VGH is generated by being boosted in multi-stages, from the first through third boosting voltages VGH1 through VGH3.

Referring to FIG. 5, the first boosting voltage VGH1 is generated via first boosting, and the second boosting voltage VGH2 is generated via second boosting after a first delay time T1. After a second delay time T2 after the second boosting voltage VGH2 is generated, the third boosting voltage VGH3 is generated via third boosting. Each of the first and second delay times T1 and T2 may be set equal to and/or within the range from about 5 ms to about 10 ms.

Then, the generated third boosting voltage VGH3 is applied to a gate line as a gate-on voltage, and thus, a switching device connected to the gate line is turned on, and a data voltage is applied to a pixel.

Values of the first through third boosting voltages VGH1 through VGH3 may be voltage values based on a ground voltage VGND of 0 V.

Figure 6A:
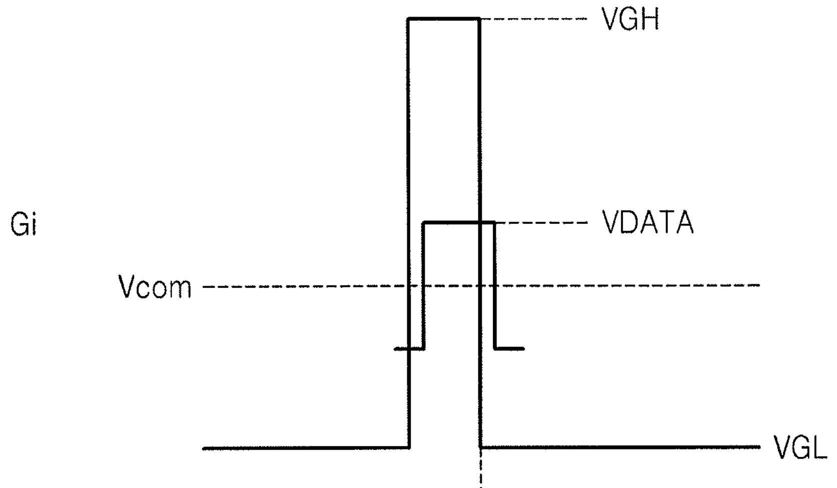
FIGS. 6A and 6B illustrate waveform diagrams of a gate line voltage and a data charging voltage employable in an exemplary embodiment of a method of driving a liquid crystal panel.
Figure 6B:
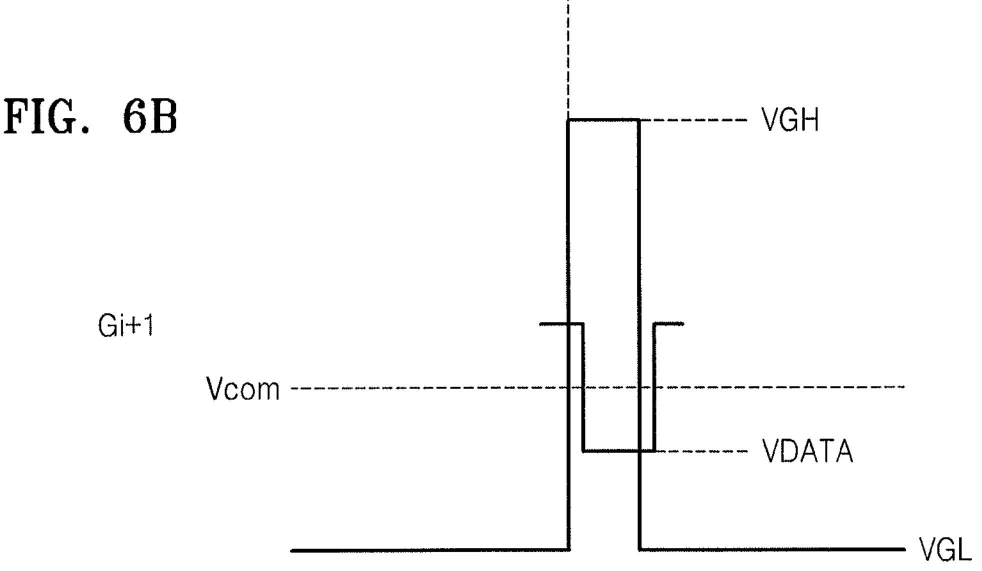

FIGS. 6A and 6B illustrate waveform diagrams of a gate line voltage and a data charging voltage employable in an exemplary embodiment of a method of driving a liquid crystal panel employing a dot-inversion approach.

The gate-on voltage VGH applied to the ith gate line Gi and the i+1th gate line Gi+1 of FIGS. 6A and 6B is formed via boosting in multi-stages, as shown in FIG. 5.

Accordingly, a white flash phenomenon of a liquid crystal panel due to boosting of the gate-on voltage VGH may be prevented before applying the gate-on voltage VGH and a data voltage VDATA.

Referring to FIG. 6A, the liquid crystal capacitor Clc of an ith pixel is charged by the data voltage VDATA of a positive polarity (+) during 1 H (horizontal period) while the gate-on voltage VGH generated via boosting in multi-stages is applied to the ith gate line Gi. The data voltage VDATA charged in the liquid crystal capacitor Clc is maintained for 1 frame after the gate-off voltage VGL is applied.

Then, referring to FIG. 6B, the liquid crystal capacitor Clc is charged by the data voltage VDATA of a negative polarity (−) during 1 H while the gate-on voltage VGH generated via boosting in multi-stages is applied to the i+1th gate line Gi+1. The data voltage VDATA charged in the liquid crystal capacitor Clc is maintained for 1 frame after the gate-ff voltage VGL is applied.

In one or more embodiments, as discussed above, the storage capacitor Cst may be connected to the ith gate line Gi, and a voltage charged in the liquid crystal capacitor Clc after the gate-off voltage VGL is applied is maintained as a voltage charged through the gate-on voltage VGH in the ith gate line Gi.

Figure 7:
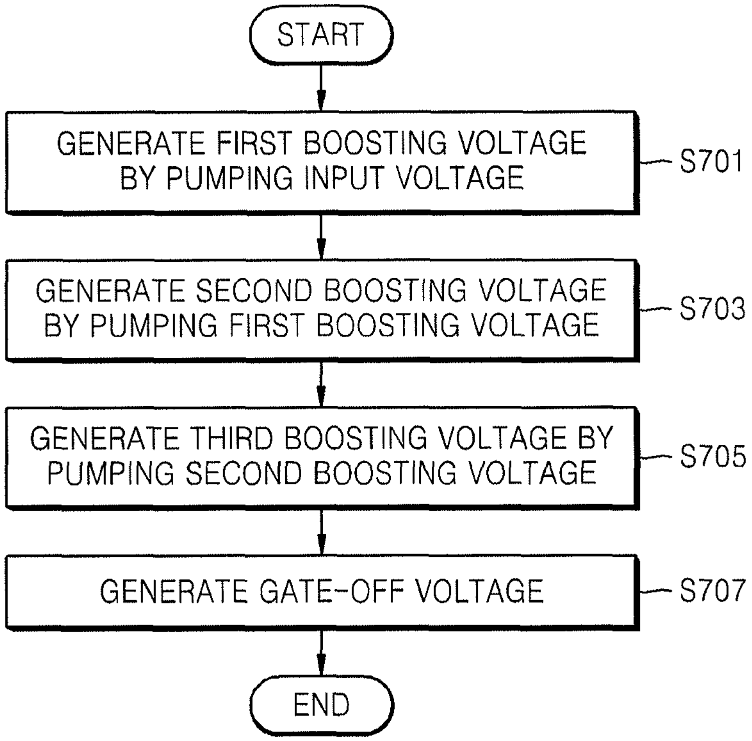
FIG. 7 illustrates a flowchart of an exemplary embodiment of a method of generating a gate voltage.

FIG. 7 illustrates a flowchart of an exemplary embodiment of a method of generating a gate voltage.

Referring to FIG. 7, a gate-on voltage generator of a gate driver generates a gate-on voltage via boosting in multi-stages, e.g., by boosting a first input voltage in 3-stages. A switching device of a pixel is turned on during a turn-on period of the gate-on voltage VGH.

The gate-on voltage generator may generate a first boosting voltage by pumping the first input voltage (S701).

The gate-on voltage generator may generate a second boosting voltage by pumping the first boosting voltage (S703). A difference between the first and second boosting voltages may be below or equal to 1 V.

The gate-on voltage generator may generate a third boosting voltage by pumping the second boosting voltage (S705). A difference between the second and third boosting voltages may be below or equal to 1 V. The third boosting voltage is at least a gate-on voltage. Embodiments are not limited to three boosts. More particularly, e.g., in one or more embodiments there may be n boosts, and the nth boosting voltage may be the gate on voltage.

In one or more embodiments, the gate-on voltage generated via boosting in multi-stages is sequentially applied to gate lines, and a switching device of a pixel is turned on by the gate-on voltage. A data voltage is applied to the pixel via the turned-on switching device.

After the gate-on voltage is generated via the boosting in multi-stages, the gate-on voltage is applied to the gate lines, thereby preventing a white flash phenomenon of a liquid crystal panel, which momentarily occurs when the liquid crystal panel is started to be driven.

A gate-off voltage generator may generate a gate-off voltage by decompressing a second input voltage (S707). The gate-off voltage is applied to the gate lines after a predetermined time after the gate-on voltage is applied to the gate lines.

In one or more embodiments, a storage capacitor using a voltage of a previous or subsequent gate line instead of a common voltage to charge a storage capacitor may be provided. By employing the respective gate line, e.g., Gi, and the adjacent gate line Gi+1 or Gi−1 to charge the storage capacitor Cst, one or more embodiments of the LCD 100 may have relatively low manufacturing costs and simple manufacturing process by at least eliminating a need of a doping mask and/or doping process for amorphous silicon (P—Si). Thus, in one or more embodiments, a doping mask for amorphous silicon is not additionally required and manufacturing cost and/or complexity may be reduced.

In one or more embodiments, a gate-on voltage is generated via boosting of at least 3-stages, and thus, a white flash phenomenon that occurs when an LCD is started to be driven can be prevented.

While features have been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A liquid crystal display device (LCD), comprising:

a display panel including a plurality of pixels defined as a plurality of gate lines and a plurality of data lines cross each other, wherein a storage capacitor of each of the plurality of pixels is connected to an adjacent gate line;

a gate driver to selectively supply a gate-on voltage and a gate-off voltage to each of the plurality of gate lines, the gate-on voltage for turning on a switching device of each of the plurality of pixels, and the gate-off voltage for turning off the switching device, wherein the gate-on voltage is generated by boosting a first input voltage in multi-stages; and a source driver to apply a data voltage to a data line connected to a pixel whose switching device is turned on, wherein:

the gate driver includes a gate-on voltage generator to generate the gate-on voltage, and the gate-on voltage generator includes:

a first booster to generate a first boosting voltage by pumping the first input voltage;

a second booster to generate a second boosting voltage by pumping the first boosting voltage, the second boosting voltage being higher than the first boosting voltage; and a third booster to generate a third boosting voltage by pumping the second boosting voltage, the third boosting voltage being higher than the second boosting voltage, wherein:

the second boosting voltage is pumped from the first boosting voltage, after a delay time of about 5 ms to 10 ms after the first boosting voltage is pumped, and the third boosting voltage is pumped from the second boosting voltage, after a delay time of about 5 ms to 10 ms after the second boosting voltage is pumped, and is output as the gate-on voltage to each of the plurality of gate lines.

2. The LCD of claim 1, wherein the gate driver further comprises a gate-off voltage generator to generate the gate-off voltage.

3. The LCD of claim 1, wherein a difference between the first and second boosting voltages is below or equal to 1 V.

4. The LCD of claim 1, wherein a difference between the second and third boosting voltages is below or equal to 1 V.

5. The LCD of claim 1, wherein the gate-on voltage is generated via boosting three or more stages.

6. The LCD of claim 1, wherein each of the plurality of pixels comprises:

a switching device including a gate electrode connected to a gate line, a source electrode connected to a data line, and a drain electrode connected to a pixel electrode;

a liquid crystal capacitor having one end connected to the pixel electrode, and charged by a potential difference between the pixel electrode and a common electrode; and a storage capacitor having one end connected to the liquid crystal capacitor and another end connected to a front or rear gate line, and charged when the gate-on voltage is applied to the front or rear gate line.

7. The LCD of claim 1, wherein the storage capacitor of each of the plurality of pixels is connected to the adjacent gate line corresponding to a gate line of an adjacent one of the plurality of pixels.

8. A liquid crystal display device (LCD), comprising:

a gate-on voltage generator to generate a gate-on voltage by boosting a first input voltage in multi-stages, the gate-on voltage for turning on a switching device of a pixel connected to a gate line; and a gate-off voltage generator to generate a gate-off voltage by decompressing a second input voltage, and applying the gate-off voltage to the gate line, wherein the gate-on voltage generator includes:

a first booster to generate a first boosting voltage by pumping the first input voltage;

a second booster to generate a second boosting voltage by pumping the first boosting voltage, the second boosting voltage being higher than the first boosting voltage; and a third booster to generate a third boosting voltage by pumping the second boosting voltage, the third boosting voltage being higher than the second boosting voltage, wherein:

the second boosting voltage is pumped from the first boosting voltage, after a delay time of about 5 ms to 10 ms after the first boosting voltage is pumped, and the third boosting voltage is pumped from the second boosting voltage, after a delay time of about 5 ms to 10 ms after the second boosting voltage is pumped, and is output as the gate-on voltage to the gate line.

9. The LCD of claim 8, wherein a difference between the first and second boosting voltages is below or equal to 1 V.

10. The LCD of claim 8, wherein a difference between the second and third boosting voltages is below or equal to 1 V.

11. The LCD of claim 8, wherein the gate-on voltage is generated via boosting three or more stages.

12. A method of driving a liquid crystal display device (LCD), the method comprising:

generating a gate-on voltage by boosting a first input voltage in multi-stages;

applying the generated gate-on voltage to a gate line to turn on a switching device of a pixel; and generating a gate-off voltage by decompressing a second input voltage, and applying the gate-off voltage to the gate line to turn off the switching device, wherein the generating of the gate-on voltage includes:

generating a first boosting voltage by pumping the first input voltage;

generating a second boosting voltage by pumping the first boosting voltage, the second boosting voltage being higher than the first boosting voltage; and generating a third boosting voltage by pumping the second boosting voltage, the third boosting voltage being higher than the second boosting voltage, wherein:

the second boosting voltage is pumped from the first boosting voltage, after a delay time of about 5 ms to 10 ms after the first boosting voltage is pumped, and the third boosting voltage is pumped from the second boosting voltage, after a delay time of about 5 ms to 10 ms after the second boosting voltage is pumped, and is output as the gate-on voltage to the gate line.

13. The method of claim 12, wherein a difference between the first and second boosting voltages is below or equal to 1 V.

14. The method of claim 12, wherein a difference between the second and third boosting voltages is below or equal to 1 V.

15. The method of claim 12, wherein the gate-on voltage is generated via boosting three or more stages.

* * * * *